US012743865B2

(12) United States Patent
Noh

(10) Patent No.: US 12,743,865 B2
(45) Date of Patent: Sep. 22, 2026

(54) APPARATUS FOR RECOGNIZING OBJECT AND METHOD THEREOF

(71) Applicants: Hyundai Motor Company, Seoul (KR); Kia Corporation, Seoul (KR)

(72) Inventor: Mi Rim Noh, Jeonju-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 261 days.

(21) Appl. No.: 18/630,150

(22) Filed: Apr. 9, 2024

(65) Prior Publication Data

US 2025/0061683 A1 Feb. 20, 2025

(30) Foreign Application Priority Data

Aug. 17, 2023 (KR) ........................ 10-2023-0107849

(51) Int. Cl.
*G06V 10/44* (2022.01)
*G01B 11/02* (2006.01)
*G06V 20/56* (2022.01)

(52) U.S. Cl.
CPC ............ *G06V 10/44* (2022.01); *G01B 11/026* (2013.01); *G06V 20/588* (2022.01)

(58) Field of Classification Search
CPC ...... G01B 11/026; G06V 10/44; G06V 20/58; G06V 20/588; G06V 20/56
USPC .......................................................... 382/195
See application file for complete search history.

(56) References Cited

U.S. PATENT DOCUMENTS 11,423,546 B2 8/2022 Noh et al.
2020/0174130 A1* 6/2020 Banerjee ................. B60R 11/04
2020/0200566 A1* 6/2020 Kim ....................... G06V 20/56
2021/0312633 A1 10/2021 Noh et al.
2022/0204029 A1* 6/2022 Chen ....................... G01S 17/42
2022/0229186 A1* 7/2022 Lee ........................ G06V 10/46
2023/0154194 A1* 5/2023 Zink .................... G06V 20/647
382/103

FOREIGN PATENT DOCUMENTS

KR 10-2021-0124789 A 10/2021

* cited by examiner

*Primary Examiner* — Chineyere Wills-Burns
*Assistant Examiner* — Emmanuel Silva-Avina
(74) *Attorney, Agent, or Firm* — Banner & Witcoff, Ltd.

(57) ABSTRACT

An apparatus may include a first LIDAR, a second LIDAR, and a processor. The processor may identify contour points of an object by using or changing points obtained through any one of the first LIDAR and the second LIDAR among points obtained through the first LIDAR and included in a specific frame and points obtained through the second LIDAR and included in the specific frame, based on obtaining a signal indicating a limited space where a host vehicle is located, from the map system. The points obtained through the first LIDAR and included in the specific frame may be obtained from a same object as the points obtained through the second LIDAR and included in the specific frame.

20 Claims, 12 Drawing Sheets

HDP on
Dataindex: 77, TotalLane: 2
LatState: 1, LongState: 1
PreTrans: 0, MapState: 1
RoadClass: 2. InTunnel: 1

403

401

APPARATUS FOR RECOGNIZING OBJECT AND METHOD THEREOF

CROSS-REFERENCE TO RELATED APPLICATION

This application claims the benefit of priority to Korean Patent Application No. 10-2023-0107849, filed in the Korean Intellectual Property Office on Aug. 17, 2023, the entire contents of which are incorporated herein by reference.

TECHNICAL FIELD

The present disclosure relates to an object recognition apparatus and method, and more particularly, to a technique for identifying a contour point of an object based on points obtained through one or more sensors (e.g., a light detection and ranging (LIDAR) and/or any other object sensors).

BACKGROUND

Various researches have been conducted for developing autonomous vehicle technology. In order for a vehicle to respond to an unexpected situation and adjust its driving path without driver's manipulation, more accurate information about a surrounding environment may need to be obtained and utilized.

A vehicle may obtain data indicating the position of an object around the vehicle through one or more sensors, such as a LIDAR. The LIDAR may obtain a distance from the LIDAR to the object through an interval between a time point at which the laser is transmitted and a time point at which the laser reflected on the object is received. The vehicle may identify the position of a point included in the object in a space where the vehicle is located, based on the angle of the transmitted laser and the distance to the object.

For a wide range of measurement, a plurality of LIDARs may be installed on an autonomous vehicle, and accordingly, there has been a discussion about how to process data obtained through the plurality of LIDARs.

SUMMARY

The following summary presents a simplified summary of certain features. The summary is not an extensive overview and is not intended to identify key or critical elements.

An aspect of the present disclosure provides an object recognition apparatus and method for increasing the accuracy of the position of an identified object by processing data obtained through a plurality of LIDARs.

Another aspect of the present disclosure provides an object recognition apparatus and method for increasing the accuracy of the location of a host vehicle identified in a specific space (e.g., a covered passage, such as a tunnel) by using data obtained through a plurality of LIDARs and processed.

Another aspect of the present disclosure provides provide an object recognition apparatus and method for reducing the amount of computation by processing data obtained through a plurality of LIDARs only when an object to be identified is a specified object.

The technical problems to be solved by the present disclosure are not limited to the aforementioned problems, and any other technical problems not mentioned herein will be clearly understood from the following description by those skilled in the art to which the present disclosure pertains.

An apparatus may comprise: a first sensor; a second sensor; a processor; and memory storing instructions that, when executed by the processor, cause the apparatus to: identify, based on sensing information of the first sensor, a plurality of first candidate contour points of a stationary object, wherein the plurality of first candidate contour points corresponds to a specific frame; identify, based on sensing information of the second sensor, a plurality of second candidate contour points of the stationary object, wherein the plurality of second candidate contour points corresponds to the specific frame; while a vehicle is driving in an area associated with a predefined type, determine, based on a direction of the stationary object from the vehicle, contour points of the stationary object, wherein the determined contour points of the stationary object are further based on: the plurality of first candidate contour points and an adjustment of the second candidate contour points; or the plurality of second candidate contour points and an adjustment of the first candidate contour points; and generate a signal indicating the determined contour points of the stationary object to display a location of the stationary object in a map.

The area associated with the predefined type may comprise a tunnel, and wherein the instructions that, when executed by the processor, cause the apparatus to determine that the stationary object is not a dynamic object based on the contour points not representing a side mirror and not representing exhaust gas.

The instructions, when executed by the processor, may cause the apparatus to: identify a shape box representing the stationary object, wherein the shape box comprises at least one of: the plurality of first candidate contour points or the plurality of second candidate contour points, and determine the contour points of the stationary object based on a length of a line segment of the shape box in a longitudinal direction being greater than or equal to a first threshold length, and a length of a line segment of the shape box in a lateral direction being greater than or equal to a second threshold length.

The instructions, when executed by the processor, may cause the apparatus to identify a shape box in the specific frame, wherein the shape box comprises at least one of: the plurality of first candidate contour points or the plurality of second candidate contour points, and determine the contour points based on a length of a line segment of the shape box in a longitudinal direction being longer than a length of a line segment of the shape box in a lateral direction, wherein the longitudinal direction is in parallel to a driving direction of the vehicle.

The instructions, when executed by the processor, may cause the apparatus to determine the contour points based on: the plurality of second candidate contour points; and a distance between the second sensor and the stationary object being closer than a distance between the first sensor and the stationary object, and wherein the adjustment of the first candidate contour points comprises an exclusion of at least one of the first candidate contour points.

The instructions, when executed by the processor, may cause the apparatus to determine the contour points based on: the plurality of first candidate contour points; and the stationary object being located at a side direction of the vehicle, wherein the first sensor is located at the side direction of the vehicle, and wherein the adjustment of the second candidate contour points comprises an exclusion of at least one of the second candidate contour points.

The instructions, when executed by the processor, may cause the apparatus to, based on a distance between the second sensor and the stationary object being closer than a distance between the first sensor and the stationary object: move at least one candidate contour point of the plurality of first candidate contour points toward a driving direction of the vehicle, and determine the contour points, wherein an amount of the movement of the at least one candidate contour point of the plurality of first candidate contour points is determined based on a distance identified based on at least one of: coordinates of a first point of the plurality of first candidate contour points, coordinates of a second point of the plurality of second candidate contour points corresponding to the first point, a difference between a time when the first sensor acquires the specific frame and a time when the second sensor acquires the specific frame, or a speed of the vehicle.

An adjusted spaced distance between a first point obtained via the first sensor and an adjusted point that is obtained via the second sensor and corresponds to the first point may be smaller than an unadjusted spaced distance between the first point and an unadjusted point that is obtained through via the second sensor and corresponds to the first point, wherein the first point and the unadjusted point may be obtained from a same part of the stationary object.

The instructions, when executed by the processor, may cause the apparatus to: based on identifying the stationary object in one side direction of the vehicle, move a point corresponding to another side direction of the vehicle different from the one side direction and obtained through one of the first sensor or the second sensor toward a driving direction of the vehicle; and determine the contour points of the stationary object based on one of the first sensor or the second sensor that corresponds to the one side direction.

The stationary object may comprise an emergency escape route in a tunnel, and the first sensor and the second sensor may be installed on the vehicle and arranged to be spaced apart from each other.

An apparatus may comprise: a first sensor; a second sensor; a processor; and memory storing instructions that, when executed by the processor, cause the apparatus to: identify, based on sensing information of the first sensor, a plurality of first candidate contour points of a stationary object, wherein the plurality of first candidate contour points corresponds to a specific frame; identify, based on sensing information of the second sensor, a plurality of second candidate contour points of the stationary object, wherein the plurality of second candidate contour points corresponds to the specific frame; and while a vehicle is driving in an area associated with a predefined type, adjust the plurality of first candidate contour points or the plurality of second candidate contour points to reduce a spaced distance between the plurality of first candidate contour points and the plurality of second candidate contour points, wherein one of the plurality of first candidate contour points and one of the plurality of second candidate contour points represent a same part of the stationary object, and wherein the spaced distance is determined based on a distance between the one of the plurality of first candidate contour points and the one of the plurality of second candidate contour points.

The instructions, when executed by the processor, may cause the apparatus to move the plurality of first candidate contour points in a driving direction of the vehicle based on a distance between the second sensor and the stationary object being closer than a distance between the first sensor and the stationary object, and wherein an amount of the movement of the plurality of first candidate contour points is determined based on a distance identified based on at least one of: coordinates of a first point of the plurality of first candidate contour points, coordinates of a second point of the plurality of second candidate contour points corresponding to the first point, a difference between a time when the first sensor acquires the specific frame and a time when the second sensor acquires the specific frame, or a speed of the vehicle.

The instructions, when executed by the processor, may cause the apparatus to adjust the plurality of first candidate contour points or the plurality of second candidate contour points by: based on identifying the stationary object in a first side direction of the vehicle, moving one or more candidate contour points identified based on points corresponding to a second side direction of the vehicle different from the first side direction of the vehicle in a driving direction of the vehicle, wherein an amount of the movement of the one or more candidate contour points by a distance identified based at least one of: coordinates of the one or more candidate contour points, coordinates of one or more candidate contour points identified based on points corresponding to the first side direction, a difference in a time when the first sensor acquires the specific frame and a time when the second sensor acquires the specific frame, or a speed of the vehicle.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
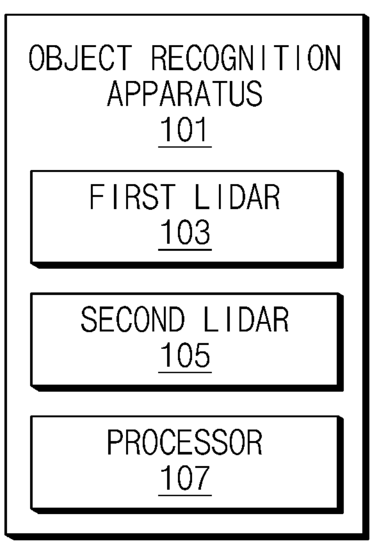
FIG. 1 is a block diagram showing a configuration of an object recognition apparatus.

Hereinafter, various examples of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components according to the present disclosure, terms such as first, second, “A”, “B”, (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, various examples of the present disclosure will be described in detail with reference to FIGS. 1 to 10.

FIG. 1 is a block diagram showing a configuration of an object recognition apparatus.

An object recognition apparatus 101 may be implemented inside a vehicle. In this case, the object recognition apparatus 101 may be integrally formed with internal control units of the vehicle or may be implemented as a separate device and connected to the control units of the vehicle via a connector.

Referring to FIG. 1, the object recognition apparatus 101 may include a first sensor (e.g., a first LIDAR 103), a second sensor (e.g., a second LIDAR 105), and a processor 107. The object recognition apparatus 101 and/or the processor may further include one or more storage devices (e.g., memory)

The first LIDAR 103 and/or the second LIDAR 105 may emit laser (e.g., pulsed light waves) to the surroundings of a host vehicle, which may be a vehicle including the object recognition apparatus 101, to search an environment around the host vehicle and identify one or more objects in the surrounding environment. The first LIDAR 103 and/or the second LIDAR 105 may identify a distance from the LIDAR, which has emitted the laser, to a target object based on the time interval from the light emission time (e.g., the time at which the laser is emitted) to the light reception time (e.g., the time at which the emitted laser is received after the emitted laser is reflected from the target object) and the speed of the laser. The first LIDAR 103 and/or the second LIDAR 105 may obtain points indicating positions of objects (e.g., at least a portion of one or more surfaces of the objects) around the host vehicle based on the distance to the target object and the emission angle of the emitted laser.

The processor 107 of the object recognition apparatus 101 may identify contour points of the object to identify the shape of the object. The processor 107 of the object recognition apparatus 101 may identify the contour points of the object based on the points obtained through the first LIDAR 103 and/or the second LIDAR 105. The contour points may include points representing the outer shape of an object. The processor 107 of the object recognition apparatus may identify some points that may represent the shape of the object among points representing the object as the contour points of the object to reduce the amount of computation.

The first LIDAR 103 and the second LIDAR 105 may be spaced apart from each other. When the first LIDAR 103 and the second LIDAR 105 are spaced apart from each other, the time point at which the laser emitted from the first LIDAR 103 is reflected and the time point at which the laser emitted from the second LIDAR 105 is reflected may be different at a specific point of the object around the vehicle.

When the vehicle including the first LIDAR 103 and the second LIDAR 105 is in operation, the position of an object identified by the first LIDAR 103 may be different from the position of an object identified by the second LIDAR 105. The difference may be caused because the relative position of the host vehicle and the object when the first LIDAR 103 identifies a specific point of the object may be different from the relative position of the host vehicle and the object when the second LIDAR 105 identifies a specific point of the object as the vehicle is in operation. Accordingly, the processor 107 of the object recognition apparatus 101 may obtain the position of the object identified by the second LIDAR 105 that is different from the position of the object identified by the first LIDAR 103.

The processor 107 of the object recognition apparatus 101 may use or change points obtained through any one of the first LIDAR 103 and the second LIDAR 105 to accurately specify the position of the object. For example, the processor 107 of the object recognition apparatus 101 may obtain contour points of an object based on points obtained through any one of the first LIDAR 103 and the second LIDAR 105. For example, the processor 107 of the object recognition apparatus 101 may obtain contour points of an object based on points obtained and changed through any one of the first LIDAR 103 and the second LIDAR 105.

The processor 107 of the object recognition apparatus 101 may obtain contour points of the object based on the obtained points and change at least one of the obtained contour points without changing the obtained points (e.g., points obtained through any one of the first LIDAR 103 and the second LIDAR 105). The processor 107 may obtain a new set of contour points of the object based on the changed contour point (s). For example, the processor 107 of the object recognition apparatus 101 may move one contour point among first contour points obtained by the first LIDAR 103 and identified based on points included in a specific frame, and second contour points obtained by the second LIDAR 105 and identified based on points included in a specific frame.

Figure 2:
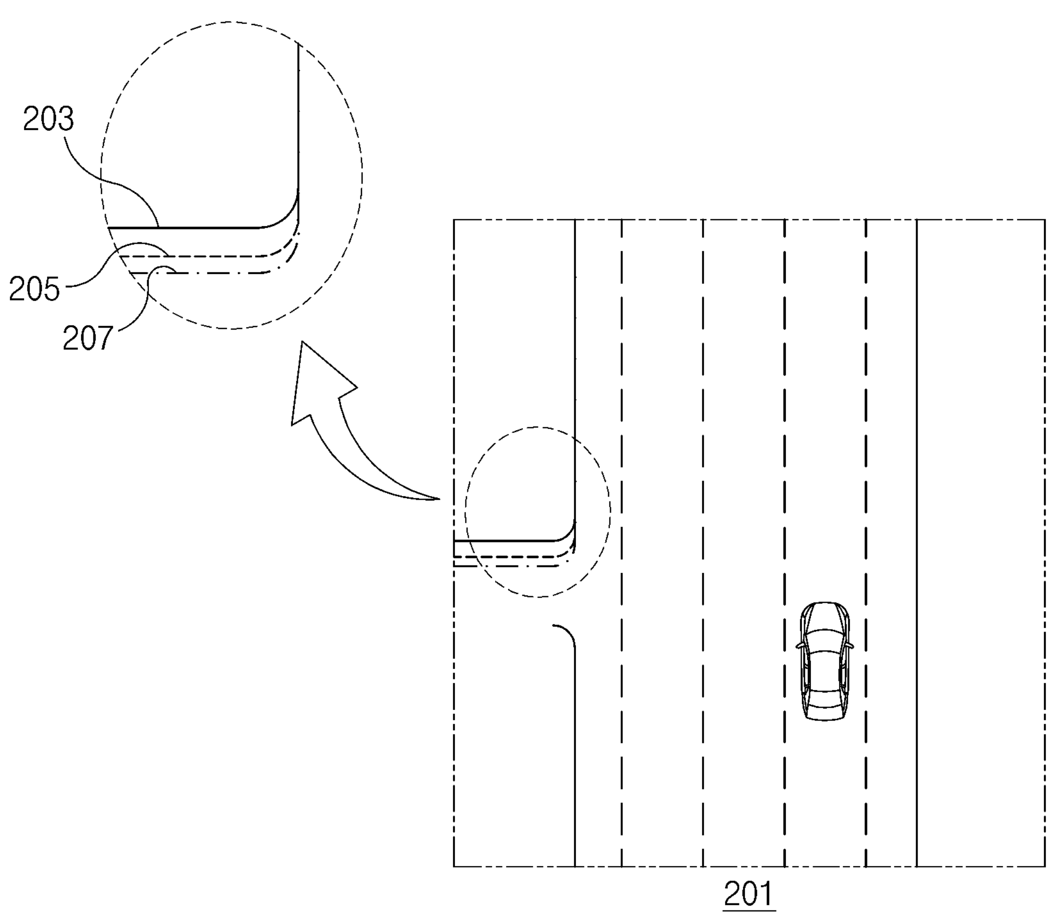
FIG. 2 is a diagram illustrating an example of points obtained by LIDAR in a specific frame in an object recognition apparatus or an object recognition method.
Figure 2:
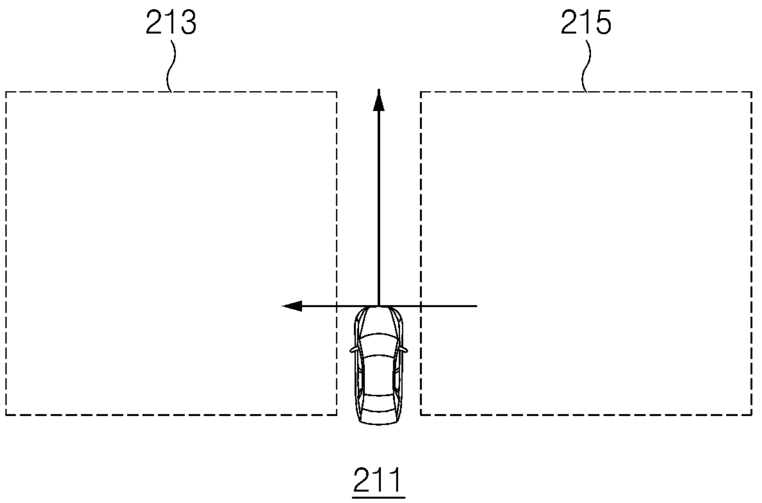

FIG. 2 is a diagram illustrating an example of points obtained by LIDAR in a specific frame in an object recognition apparatus or an object recognition method.

Referring to FIG. 2, a screen 201 may represent a surrounding environment identified by a first LIDAR, a surrounding environment identified by a second LIDAR, and a surrounding environment identified by a precision map, which are included in a specific frame. A first line 203 may represent the surrounding environment identified by the precision map. A second line 205 may represent a line connecting points obtained through the first LIDAR, which may be a LIDAR on one side of a host vehicle. A third line 207 may represent a line connecting points obtained through a second LIDAR, which may be a LIDAR on the front side of the vehicle or the other side different from the one side of the host vehicle. A top view 211 may represent one side direction 213 and the other side direction 215 distinguished based on the host vehicle, which may be a vehicle including an object recognition apparatus.

On the screen 201, the first line 203 may represent the surrounding environment by the precision map. The second line 205 may represent points obtained through the first LIDAR and included in a specific frame. The third line 207 may represent points obtained through the second LIDAR that is different from the first LIDAR and included in a specific frame.

A host vehicle may be operated in a specific location (e.g., a covered passage such as tunnels and underpasses). Points obtained through a LIDAR may represent a preset object within the specific location (e.g., an emergency evacuation route within a tunnel).

The host vehicle may improve the reliability of the information about the surrounding environment obtained through the LIDAR and identify an exact location of the host vehicle by matching the information about the surrounding environment obtained through the precision map with the surrounding environment obtained through the LIDAR.

It may be difficult for the processor of the object recognition apparatus to find points (e.g., signs, road junctions) formed laterally with respect to a road boundary in a specific space (e.g., tunnels, underpasses). Therefore, it may be difficult to set a reference point to match the surrounding environment obtained through the precision map with the surrounding environment obtained through the LIDAR. Accordingly, it may be difficult to identify the exact location of the host vehicle or improve the reliability of the information about the surrounding environment.

Therefore, the need to accurately identify an object (e.g., an emergency evacuation route in a tunnel) formed laterally in a limited space (e.g., a covered passage, such as a tunnel, an underpass) may be higher compared to the need to accurately identify an object formed laterally in an unlimited space (e.g., an uncovered passage).

The object formed laterally may be obtained through the first LIDAR and the second LIDAR. According to a difference between a location where the first LIDAR is placed and a location where the second LIDAR is placed and the driving speed of the host vehicle, the second line 205 representing the points obtained through the first LIDAR may not be matched with the third line 207 representing the points obtained through the second LIDAR. To accurately identify the position of an object, the processor of the object recognition apparatus may identify contour points of the object by using and/or changing points obtained through any one of the first LIDAR or the second LIDAR. In other words, the object recognition apparatus may identify the contour points of the object by using or changing the points represented by one of the second line 205 and the third line 207. The processor of the object recognition apparatus may improve the accuracy of the position of an object around the host vehicle and the accuracy of the position of the host vehicle by comparing a contour line connecting the contour points of the identified object with the first line 203 by the precision map.

The processor of the object recognition apparatus may identify contour points of the object by using points obtained through one of the first LIDAR and the second LIDAR. For example, the processor of the object recognition apparatus may identify contour points of the object by using the points represented by the second line 205. For example, the processor of the object recognition apparatus may identify contour points of the object by using the points represented by the third line 207.

The processor of the object recognition apparatus may identify contour points of the object by using points obtained through a LIDAR satisfying a specified condition. For example, the specified condition may include a condition that a LIDAR that obtains the points used is a LIDAR arranged in the same direction as the direction from the host vehicle to the object (e.g., the left direction of the host vehicle or the right direction of the host vehicle). For example, the specified condition may include a condition that a LIDAR that obtains the points used is a LIDAR that has a shorter distance to the object compared to other LIDARs. For example, the specified condition may include a condition that a LIDAR that obtains the points used is an LIDAR that obtains a frame containing the points earlier than other LIDARs.

The processor of the object recognition apparatus may identify contour points of the object by changing points obtained through any one of the first LIDAR or the second LIDAR. For example, the processor of the object recognition apparatus may move points represented by the third line 207 to identify contour points of the object by using points represented by the second line 205 or points represented by the moved third line 207. In other words, the processor of the object recognition apparatus may identify some of the points represented by the second line 205 as contour points of the object, and identify some of the points represented by the third line 207 as contour points of the object.

The processor of the object recognition apparatus may identify contour points of the object by moving points obtained through a LIDAR satisfying a specified condition. For example, the specified condition may include a condition that a LIDAR that obtains moved points is a LIDAR arranged in a direction (e.g., the right direction of the host vehicle or the left direction of the host vehicle) different from a direction from the host vehicle to the object (e.g., the left direction of the host vehicle or the right direction of the host vehicle). For example, the specified condition may include a condition that a LIDAR that obtains moved points is a LIDAR having a longer distance to the object than other LIDARs. For example, the specified condition may include a condition that the LIDAR that obtained moved points is a LIDAR having a later frame identification time point at which the points are obtained, compared to other LIDARs.

As described with reference to FIG. 1, the processor of the object recognition apparatus may obtain contour points of the object based on the obtained points and change the obtained contour points without changing the obtained points (e.g., points obtained through any one of the first LIDAR 103 and the second LIDAR 105) and obtaining a new set of contour points of the object based on the changed contour points. For example, the processor of the object recognition apparatus may move contour points of one group among first contour points obtained by the first LIDAR and identified based on points included in a specific frame and second contour points obtained by the second LIDAR and identified based on points included in a specific frame.

The processor of the object recognition apparatus may move points obtained through one LIDAR to be closer to points obtained through a LIDAR different from the one LIDAR.

Therefore, a spaced distance between the point obtained through the one LIDAR (e.g., one of moved points represented by the third line 207) and the point corresponding to the point obtained through the one LIDAR and obtained through the LIDAR different from the one LIDAR (e.g., one of points represented by the second line 205 and corresponding to one of moved points represented by the third line 207) after movement may be smaller than a spaced distance between the point obtained through the one LIDAR and the point corresponding to the point obtained through the one LIDAR and obtained through the LIDAR different from the one LIDAR before movement.

The point obtained through one LIDAR used to identify the spaced distance, and the point corresponding to the point obtained through the one LIDAR and obtained through a LIDAR different from the one LIDAR may be obtained from the same part.

The top view 211 may represent an example of the direction from the host vehicle to the object. The object may be in either one side direction 213 or the other side direction 215. The one side direction 213 may include the left side of the host vehicle. The other side direction 215 may include the right side of the host vehicle. Hereinafter, a condition for specifying a LIDAR according to the direction in which the object is located is described with reference to FIGS. 6 and 9.

In FIG. 2, one side direction is described as including the left direction alone, and the other side direction is described as including the right direction alone, but the terminology used in the present disclosure may not be limited thereto. In an example, one side direction may include a right direction of the host vehicle, and the other side direction may include a left direction of the host vehicle.

Figure 3:
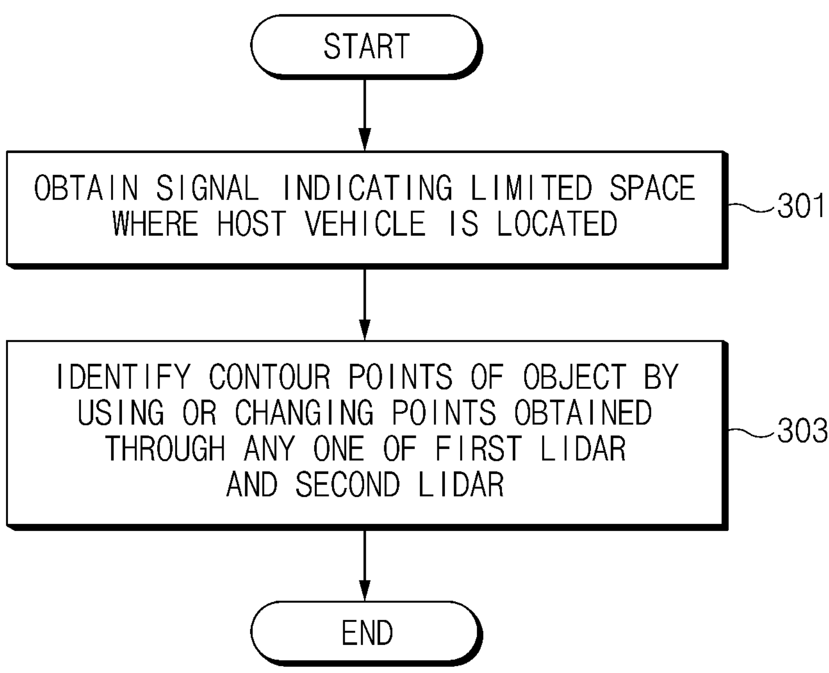
FIG. 3 shows a flowchart of operation of an object recognition apparatus for identifying contour points of an object in the object recognition apparatus or an object recognition method.

FIG. 3 shows a flowchart of operation of an object recognition apparatus for identifying contour points of an object in the object recognition apparatus or an object recognition method.

Hereinafter, it is assumed that the object recognition apparatus 101 of FIG. 1 performs the process of FIG. 3, but aspects of the present disclosure are not limited thereto. Additionally, in the description of FIG. 3, operations described as being performed by the apparatus or processor may be understood as being controlled by the processor 107 of the object recognition apparatus 101.

Referring to FIG. 3, in a first operation 301, the processor of the object recognition apparatus may obtain a signal indicating a specific space (e.g., a limited space, a covered passage, etc.) where a host vehicle is located. The processor of the object recognition apparatus may use or change points obtained through one of LIDARs spaced apart from one another only when the host vehicle is in a limited space to reduce the amount of computation. When a vehicle including an object recognition apparatus enters a specific space (e.g., a tunnel, an underpass), the processor of the object recognition apparatus may obtain a signal indicating that the vehicle is in the specific space from the map system.

In a second operation 303, the processor of the object recognition apparatus may identify contour points of an object by using or changing points obtained through any one of the first LIDAR and the second LIDAR. The second operation 303 may be performed to increase accuracy of the position of the object.

The processor of the object recognition apparatus may identify contour points of the object based on points obtained through one of the first LIDAR and the second LIDAR. For example, the processor of the object recognition apparatus may remove or exclude points obtained through one LIDAR and identify contour points of the object by using only points obtained through another LIDAR.

The processor of the object recognition apparatus may change the points obtained through any one of the first LIDAR and the second LIDAR to identify the contour points of the object based on the changed points. For example, the processor of the object recognition apparatus may change the points obtained through one LIDAR and identify a new set of contour points of the object based on the changed points.

Although it is described in FIG. 3 that the obtained points (e.g., points obtained through any one of the first LIDAR and the second LIDAR) are changed and the contour points of the object are obtained based on the changed points, aspects of the present disclosure may not be limited thereto. Hereinafter, it will be described with reference to FIG. 11 that the contour points of the object may be obtained based on the obtained points and the obtained contour points may then be changed.

Figure 4:
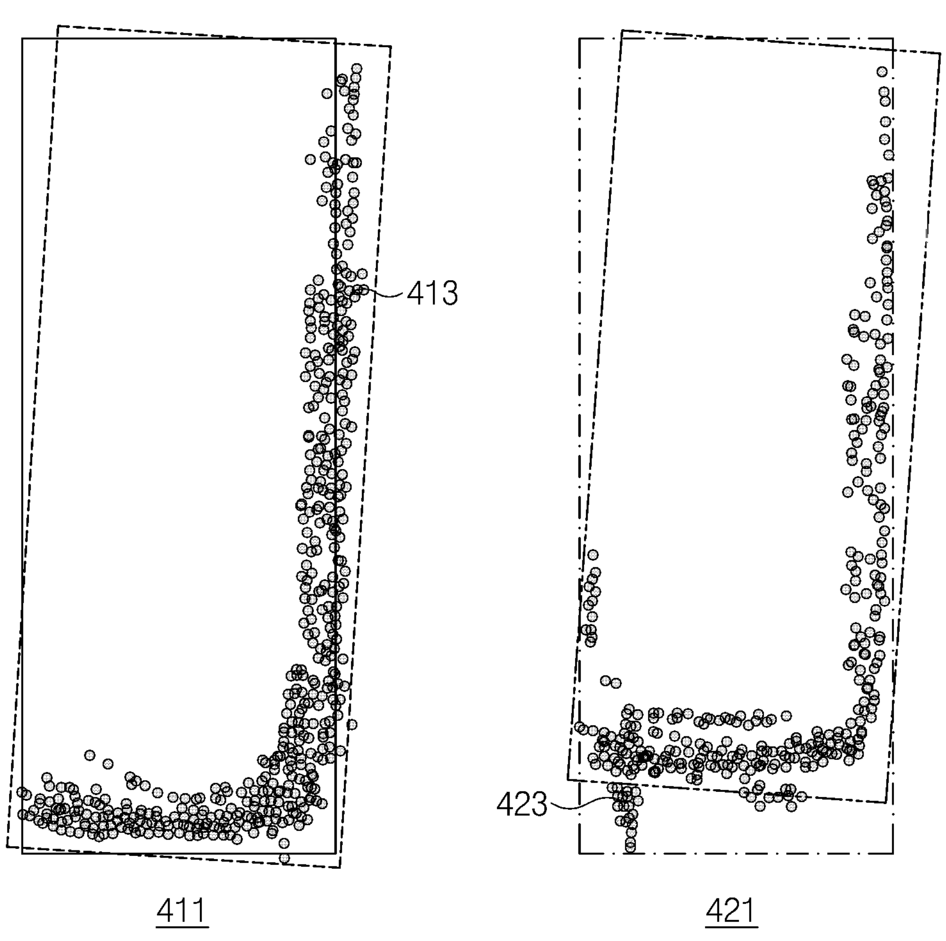
FIG. 4 shows examples of conditions for identifying whether an object is a stationary object in an object recognition apparatus or an object recognition method.

FIG. 4 shows examples of conditions for identifying whether an object is a stationary object in an object recognition apparatus or an object recognition method.

If a target object is an emergency evacuation route in a tunnel, the need for the present disclosure to increase the accuracy of the contour point of the object may be increased. If the object is an emergency evacuation route in a tunnel, one or more operations described herein may be applied. It should be noted that aspects of the present disclosure may not be limited thereto. The accuracy of the contour point of an object may be increased and the amount of computation may be reduced. Hereinafter, conditions for determining whether an object is an emergency evacuation route in a tunnel are described.

Referring to FIG. 4, the processor of the object recognition apparatus may identify a tunnel identifier 403 indicating whether a host vehicle, which may be a vehicle including the object recognition apparatus, is in a tunnel on a screen 401. The processor of the object recognition apparatus may identify at least one point 413 representing a side mirror among points included in a first frame 411 and representing an object. The processor of the object recognition apparatus may identify at least one point 423 representing exhaust gas (e.g., vehicle exhaust) among points included in a second frame 421 and representing an object.

The processor of the object recognition apparatus may identify whether the host vehicle is in a tunnel. If the host vehicle is not located in a tunnel, the probability that an object identified around the host vehicle is an emergency evacuation route in the tunnel is low. The processor of the object recognition apparatus may obtain, from the map system, a signal indicating that the host vehicle is in a tunnel. If the signal indicating that the host vehicle is in a tunnel is received, the processor of the object recognition apparatus may store an identifier indicating that the signal has been received. For example, the tunnel identifier 403 may be stored as a first value (e.g., "1").

The processor of the object recognition apparatus may obtain, from the map system, a signal indicating that the host vehicle is outside a tunnel. If the signal indicating that the host vehicle is outside the tunnel is received, the processor of the object recognition apparatus may store an identifier indicating the signal has been received. For example, the tunnel identifier 403 may be stored as a second value (e.g., "0").

The processor of the object recognition apparatus may identify whether the object is not a dynamic object. If the object is a dynamic object, the probability that the object identified around the host vehicle is an emergency evacuation route within the tunnel is low. The processor of the object recognition apparatus may identify that an object represented by points included in a specific frame is a dynamic object (e.g., a vehicle) if at least one point 413 corresponding to a side mirror and at least one point 423 corresponding to exhaust gas among the points included in the specific frame (e.g., frame 411 or frame 421) is identified.

The processor of the object recognition apparatus may identify an identifier representing a specific space and identify the contour points of an object by using or changing points obtained through either the first LIDAR or the second LIDAR based on the fact that at least one point representing a side mirror and exhaust gas is not identified among the points representing the object and included in a specific frame.

The processor of the object recognition apparatus may identify an identifier representing a specific space and identify the contour points of an object by changing identified contour points based on the points obtained through either the first LIDAR or the second LIDAR based on the fact that at least one point representing a side mirror and exhaust gas is not identified.

Figure 5:
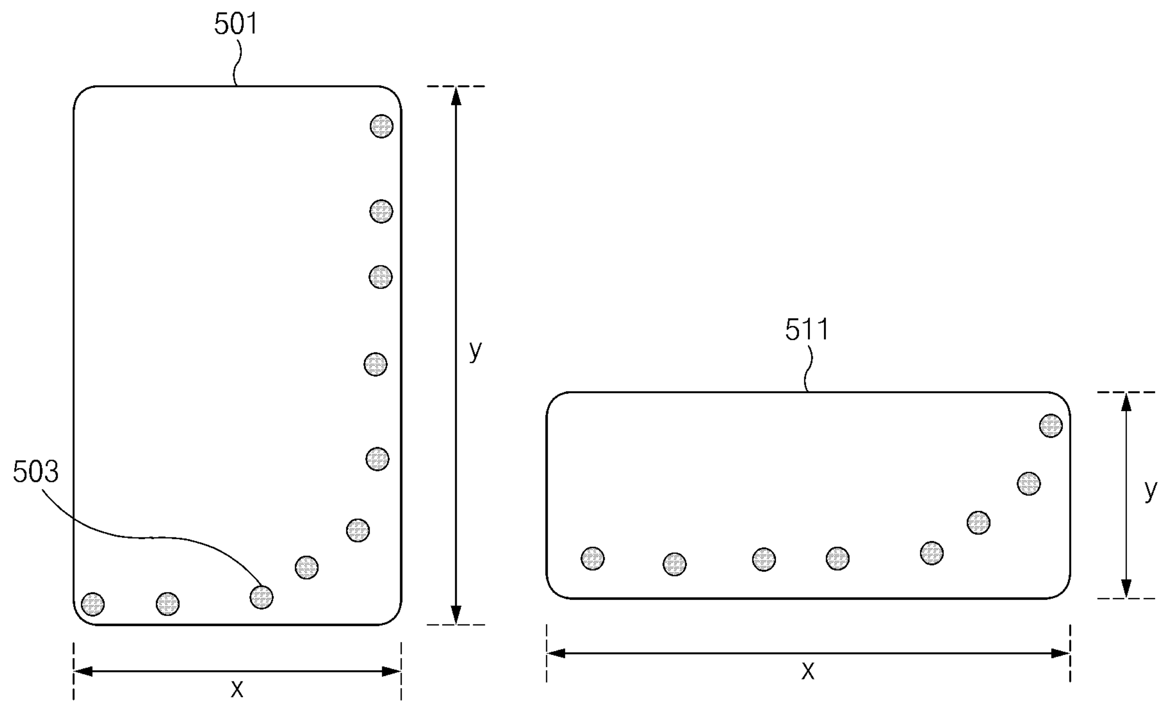
FIG. 5 shows examples of conditions for identifying whether an object is a stationary object according to the size of a shape box, in an object recognition apparatus or an object recognition method.

FIG. 5 shows examples of conditions for identifying whether an object is a stationary object according to the size of a shape box, in an object recognition apparatus or an object recognition method. As illustrated in FIG. 4, conditions for determining whether an object is an emergency evacuation route in a tunnel are described.

Referring to FIG. 5, a first shape box 501 may include points 503 obtained from a LIDAR and included in a specific frame. A second shape box 511 may include points obtained from a LIDAR and included in a specific frame.

The size of the first shape box 501 may be expressed as a length in the longitudinal direction (e.g., a direction in parallel to the road boundary direction) and a length in the lateral direction (e.g., a direction perpendicular to the road boundary direction).

The processor of the object recognition apparatus may identify contour points of an object by using or changing points obtained through any one of the first LIDAR and the second LIDAR or by changing the contour points based on the fact that the length of the first shape box 501 in the longitudinal direction is greater than or equal to a specified length (e.g., about 3.5 m) and the length in the lateral direction is greater than or equal to a specified length (e.g., about 4.5 m).

If the length of the first shape box 501 in the longitudinal direction is less than the specified length or the length in the lateral direction is less than the specified length, the probability that the object corresponding to the first shape box 501 is an emergency evacuation route in the tunnel is low. If the length of the first shape box 501 in the longitudinal direction is less than the specified length or the length in the lateral direction is less than the specified length, there is a high probability that the object represented by the points is a dynamic object (e.g., a vehicle).

The processor of the object recognition apparatus may identify contour points of an object by using or changing points obtained through any one of the first LIDAR and the second LIDAR based on the fact that the length of the second shape box 511 in the longitudinal direction (e.g. direction in parallel to the road boundary direction) is longer than the length of the second shape box 511 in the lateral direction (e.g., the direction perpendicular to the road boundary direction).

If the length of the second shape box 511 in the longitudinal direction is shorter than the length of the second shape box 511 in the lateral direction, the probability that the object corresponding to the second shape box 511 is an emergency evacuation route in a tunnel is low. If the length of the second shape box 511 in the longitudinal direction is shorter than the length of the second shape box 511 in the lateral direction, there is a high probability that the object represented by the points is a dynamic object (e.g., a vehicle).

Figure 6:
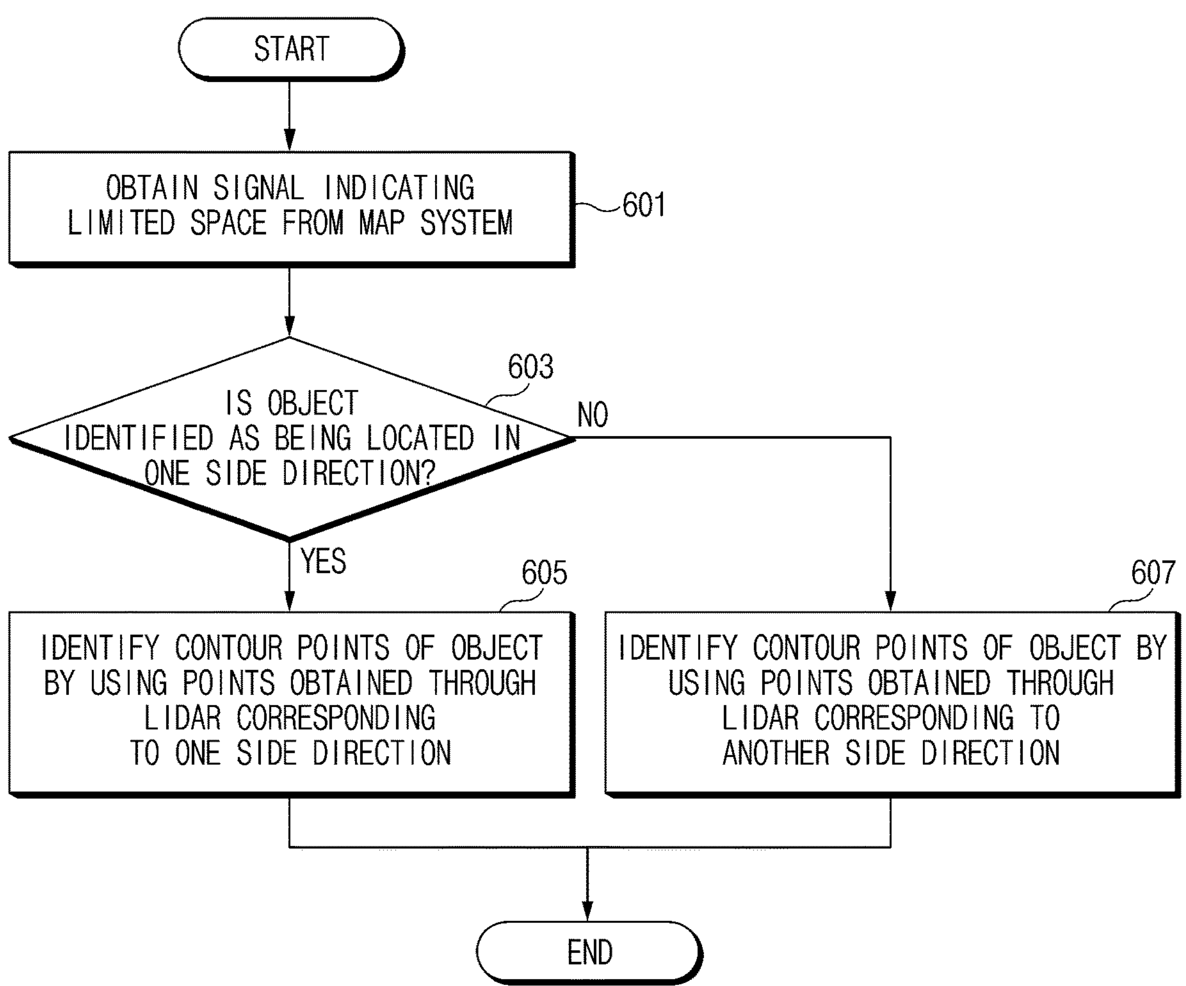
FIG. 6 shows a flowchart of operation of an object recognition apparatus for identifying contour points of an object by using points obtained through one LIDAR in the object recognition apparatus or an object recognition method.

FIG. 6 shows a flowchart of operation of an object recognition apparatus for identifying contour points of an object by using points obtained through one LIDAR in the object recognition apparatus or an object recognition method.

Hereinafter, it is assumed that the object recognition apparatus 101 of FIG. 1 performs the process of FIG. 6, but aspects of the present disclosure are not limited thereto. Additionally, in the description of FIG. 6, operations described as being performed by the apparatus or processor may be understood as being controlled by the processor 107 of the object recognition apparatus 101.

Referring to FIG. 6, in a first operation 601, the processor of the object recognition apparatus may obtain a signal representing a specific space (e.g., a tunnel or an underpass) from the map system. To reduce the amount of computation, the processor of the object recognition apparatus may use or change points obtained through one of LIDARs spaced apart from one another (e.g., only when a host vehicle is in a specific space, such as the covered passage). If an object is, in particular, an emergency evacuation route in a tunnel, the need to increase the accuracy of the contour point of the object may be increased. Accordingly, the processor of the object recognition apparatus may apply one or more features of the present disclosure (e.g., if the object is an emergency evacuation route or any other stationary object). The method of determining whether an object is an emergency evacuation route has been described above with reference to FIG. 4 and therefore, repeated description will be omitted below.

In a second operation 603, the processor of the object recognition apparatus may identify whether an object is identified as being in one side direction. If the object is identified as being in one side direction (e.g., in the left direction of the host vehicle or the right direction of the own vehicle), the processor of the object recognition apparatus may perform a third operation 605. If the object is not identified as being in one side direction, the processor of the object recognition apparatus may perform a fourth operation 607.

The side direction in which the object is located may be identified through a LIDAR. The processor of the object recognition apparatus may obtain an identifier representing the left side or an identifier representing the right side according to the direction in which points representing the object are identified through the LIDAR, together with the points.

In the third operation 605, the processor of the object recognition apparatus may identify contour points of the object according to points obtained through the LIDAR corresponding to the one side direction. This may be at least because the points obtained through the LIDAR corresponding to the one side direction in which the object is located are to be more accurate than points obtained through a LIDAR corresponding to the other side direction.

The processor of the object recognition apparatus may exclude or remove points obtained through a LIDAR corresponding to the other side direction different from the one side direction, and identify the contour points of the object according to the points obtained through the LIDAR corresponding to the one side direction.

In a fourth operation 607, the processor of the object recognition apparatus may identify contour points of the object according to the points obtained through a LIDAR corresponding to the other side direction and included in a specific frame. If an object is identified as being in the other side direction, the processor of the object recognition apparatus may exclude or remove points obtained through the LIDAR corresponding to the one side direction, and identify the contour points of the object according to points obtained through the LIDAR corresponding to the direction in which the object is located.

Figure 7:
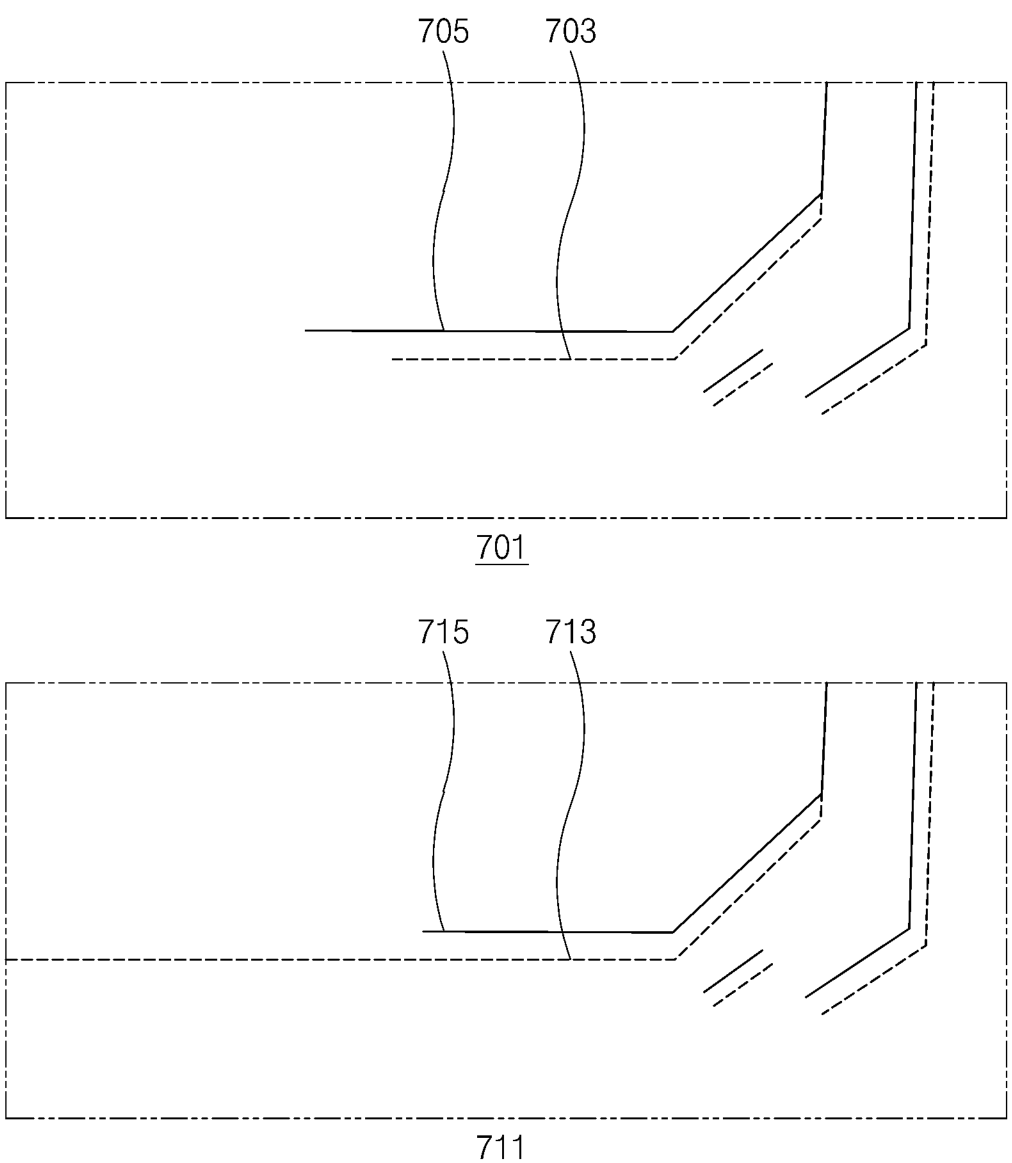
FIG. 7 shows an example of points obtained by a plurality of LIDARs in an object recognition apparatus or an object recognition method.

FIG. 7 shows an example of points obtained by a plurality of LIDARs in an object recognition apparatus or an object recognition method.

Referring to FIG. 7, points included in a first screen 701 and points included in a second screen 711 may correspond to the same object (e.g., an emergency evacuation route in a tunnel) in the left side direction. A first line 703 of the first screen 701 may represent points obtained through a LIDAR corresponding to the left side direction. A second line 705 of the first screen 701 may represent points obtained through a LIDAR corresponding to the right side direction. The first screen 701 may include points obtained previously than the points of the second screen 711. A first line 713 of the second screen 711 may indicate points obtained through a LIDAR corresponding to the left side direction. A second line 715 of the second screen 711 may represent points obtained through a LIDAR corresponding to the right side direction.

A distance between an object indicated by points at the time of obtaining points included in the first screen 701 and the host vehicle may be farther than a distance between an object indicated by points at the time of obtaining points included in the second screen 711 and the host vehicle including the object recognition apparatus. As the distance between the host vehicle and the object decreases, the number of points obtained through the LIDAR corresponding to the left side direction in which the object is located may increase. In other words, the accuracy of points obtained through the LIDAR corresponding to the left side direction in which the object is located may be higher than the accuracy of points obtained through the LIDAR corresponding to the right side direction, which is different from the LIDAR corresponding to the left side direction.

Therefore, to increase the accuracy of the location of the object, the processor of the object recognition apparatus may identify contour points of the object by using points obtained through the LIDAR corresponding to one side direction in which the object is located and included in a specific frame.

Figure 8:
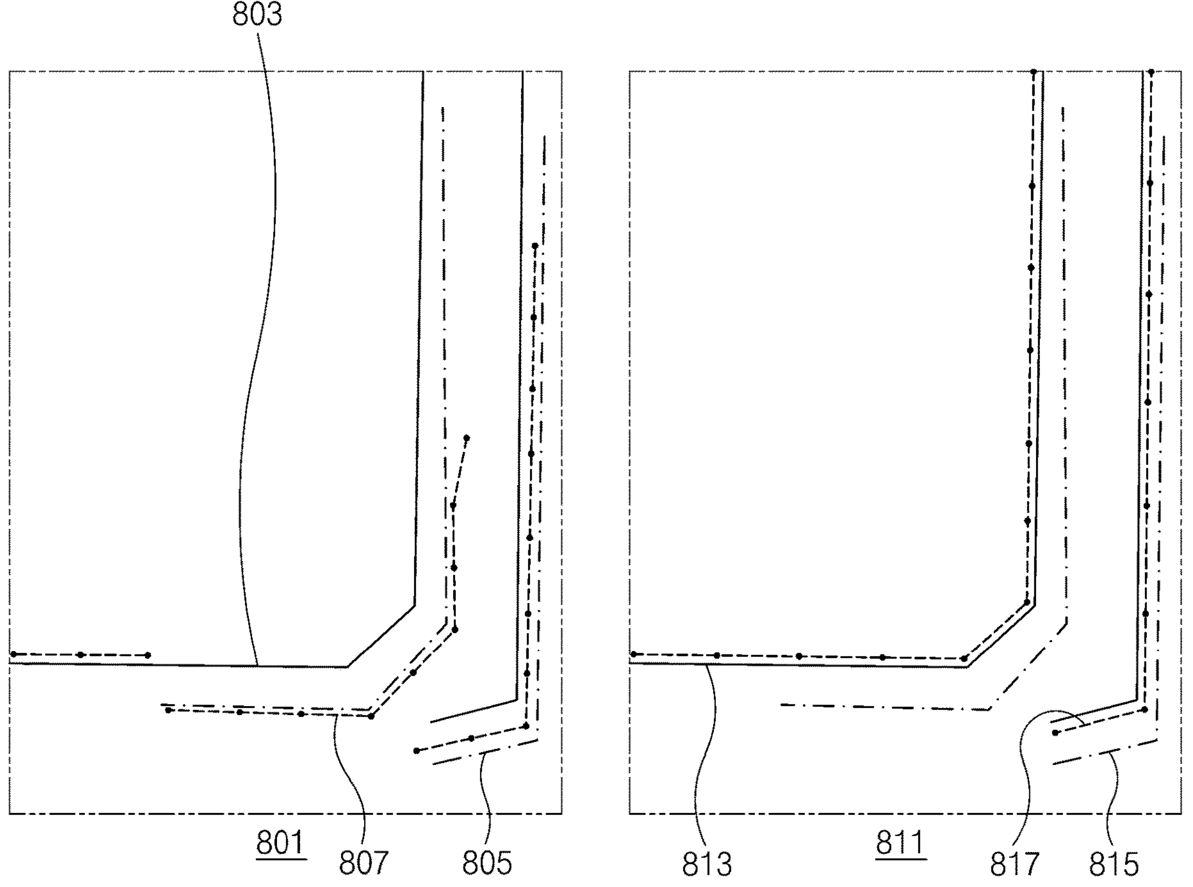
FIG. 8 shows examples of contour points identified based on a plurality of LIDARs and contour points identified based on one LIDAR in an object recognition apparatus or an object recognition method.

FIG. 8 shows examples of contour points identified based on a plurality of LIDARs and contour points identified based on one LIDAR in an object recognition apparatus or an object recognition method.

Referring to FIG. 8, in a first screen 801, an existing object recognition apparatus may identify contour points of an object by using points obtained through a first LIDAR and included in a specific frame, or points obtained through a second LIDAR and included in a specific frame. A first line 803 of the first screen 801 may represent points obtained through a LIDAR corresponding to one side direction and included in a specific frame. A second line 805 of the first screen 801 may represent points obtained through a LIDAR corresponding to the other side direction different from the one side direction and included in a specific frame. A third line 807 of the first screen 801 may represent contour points of an object.

In a second screen 811, the processor of an object recognition apparatus may identify contour points of an object by using points obtained through any one of the first LIDAR and the second LIDAR and included in a specific frame. A first line 813 of the second screen 811 may represent points obtained through a LIDAR corresponding to one side direction and included in a specific frame. A second line 815 of the second screen 811 may represent points obtained through a LIDAR corresponding to the other side direction and included in a specific frame. A third line 817 of the second screen 811 may represent contour points of the object.

In the first screen 801 and the second screen 811, the points obtained through the LIDAR corresponding to one side direction and included in the specific frame may be separated from the points obtained through the LIDAR corresponding to the other side direction different from one side direction and included in the specific frame. This may be at least because the time at which laser emitted from the LIDAR corresponding to the one side direction hits the object may be different from the time at which laser emitted from the LIDAR corresponding to the other side direction hits the object. As the vehicle is in operation, a relative position of the host vehicle and the object at the time when the laser emitted from the LIDAR corresponding to the one side direction hits the object may be different from the relative position of the host vehicle and the object at the time when the laser emitted from the LIDAR corresponding to the other side direction hits the object.

If the one or more contour points of the object are identified using one of a point obtained through the LIDAR corresponding to the one side direction and included in the specific frame or a point obtained through the LIDAR corresponding to the other side direction and included in the specific frame, the contour points of the object may be identified as being spaced apart from one another, like the third line 807 of the first screen 801. The existing object recognition apparatus may identify some of the points represented by the first line 803 of the first screen 801 as contour points of the object, and identify some of the points represented by the second line 805 of the first screen 801 as contour points of the object.

If the contour point of an object is identified using points obtained through one of the LIDAR corresponding to the one side direction or the LIDAR corresponding to the other side direction, the contour points of the object may be identified as not being spaced apart from one another like the third line 817 of the second screen 811. Accordingly, it may be confirmed that the accuracy of the location of the object identified by the processor of the object recognition apparatus has increased.

Figure 9:
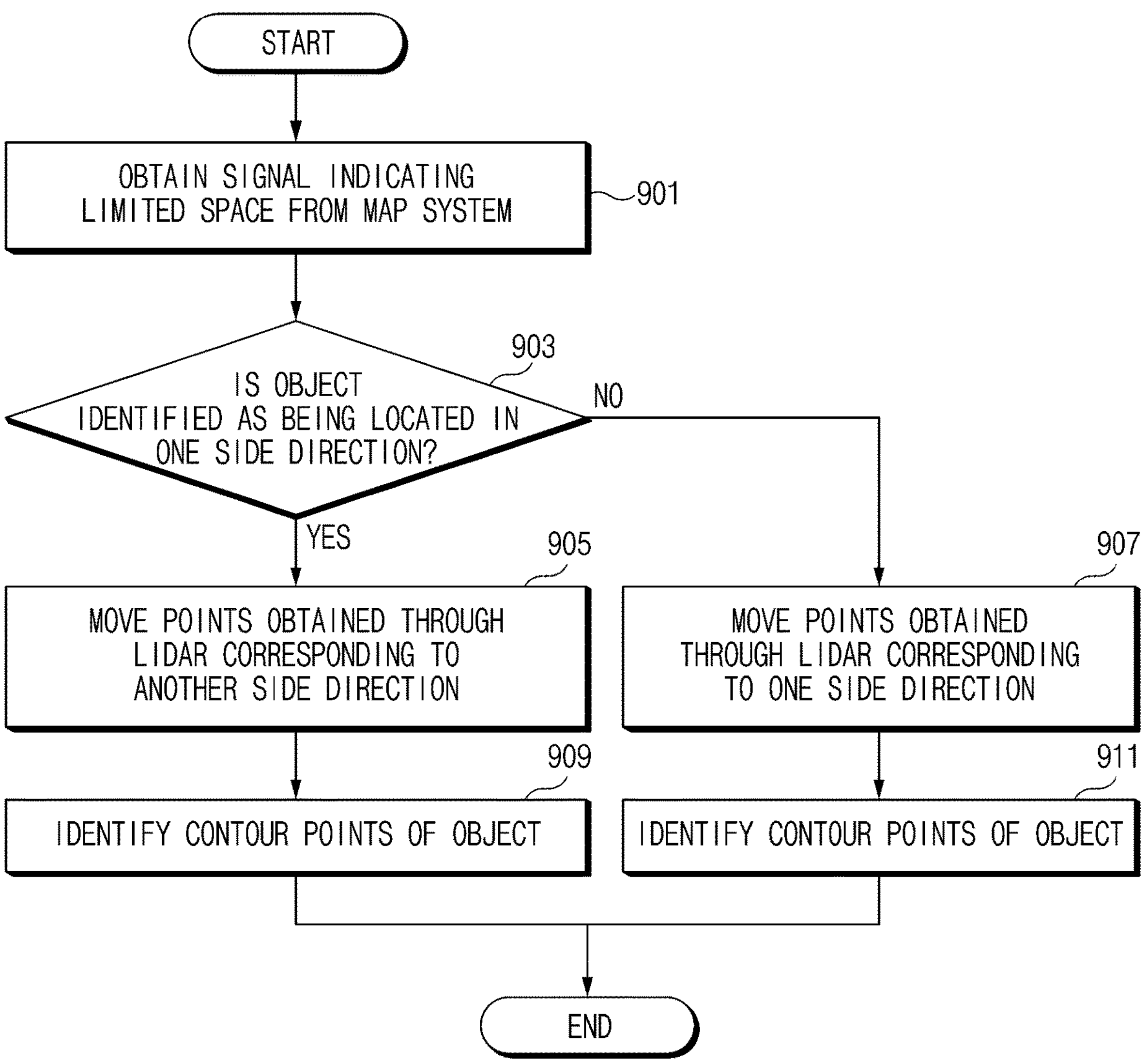
FIG. 9 shows a flowchart of operation of an object recognition apparatus for identifying contour points of an object by changing points obtained through one LIDAR in the object recognition apparatus or an object recognition method.

FIG. 9 shows a flowchart of operation of an object recognition apparatus for identifying contour points of an object by changing points obtained through one LIDAR in the object recognition apparatus or an object recognition method.

Referring to FIG. 9, in a first operation 901, the processor of the object recognition apparatus may obtain a signal indicating a specific space (e.g., a covered passage, such as a tunnel, or a dark space without sufficient ambient light or natural light) from a map system. The first operation 901 may be performed in the same manner as the operation 601 of FIG. 6, and therefore, redundant description will be omitted below.

In a second operation 903, the processor of the object recognition apparatus may identify whether an object is identified as being in one side direction. If the object is identified as being in one side direction, the processor of the object recognition apparatus may perform a third operation 905. If the object is not identified as being in one side direction, the processor of the object recognition apparatus may perform a fourth operation 907.

The side direction in which the object is located may be identified through a LIDAR. The processor of the object recognition apparatus may obtain an identifier representing the left side or an identifier representing the right side according to the direction in which points representing the object are identified through the LIDAR, together with the points.

In a third operation 905, the processor of the object recognition apparatus may move points obtained through the LIDAR corresponding to the other side direction.

The processor of the object recognition apparatus may move the points obtained through the LIDAR corresponding to the other side direction in the driving direction of the host vehicle, or in the direction of points obtained through the LIDAR corresponding to the one side direction and different from the LIDAR corresponding to the other side direction. The point obtained through the LIDAR corresponding to the other side direction may be obtained from the same part of the same object as the points obtained through the LIDAR corresponding to the one side direction and different from the LIDAR corresponding to the other side direction. This may be at least because a direction from the point obtained through the LIDAR corresponding to the other side direction to the point obtained through the LIDAR corresponding to the one side direction in which the object is located may be the driving direction of the host vehicle.

The processor of the object recognition apparatus may move the points obtained through the LIDAR corresponding to the other side direction, by a distance identified based on at least one of the coordinates of the point obtained through the LIDAR corresponding to the other side direction, the coordinates of the point corresponding to the point obtained through the LIDAR corresponding to the one side direction and corresponding to the point obtained through the LIDAR the other side direction, a difference between the time when the LIDAR corresponding to the other side direction acquires a specific frame and the time when the LIDAR corresponding to the one side direction acquires the specific frame, the speed of the host vehicle, or any combination thereof.

For example, the processor of the object recognition apparatus may move the point obtained through the LIDAR corresponding to the other side direction, by a distance identified based on a product of the difference between the time when the LIDAR corresponding to the other side direction acquires the specific frame and the time when the LIDAR corresponding to the one side direction acquires the specific frame and the speed of the host vehicle.

In the fourth operation 907, the processor of the object recognition apparatus may move the points corresponding to the one side direction.

The processor of the object recognition apparatus may move the point obtained through the LIDAR corresponding to the one side direction in the driving direction of the host vehicle or in the direction of points obtained through the LIDAR different from the LIDAR corresponding to the one side direction and the LIDAR corresponding to the other side direction. This may be because a direction from the point obtained through the LIDAR corresponding to the one side direction in which the object is located to the point obtained through the LIDAR corresponding to the other side direction may be the driving direction of the host vehicle.

The processor of the object recognition apparatus may move the point obtained through the LIDAR corresponding to the one side direction, by a distance identified based on at least one of the coordinates of the point obtained through the LIDAR corresponding to the one side direction, the coordinates of the point corresponding to the point obtained through the LIDAR corresponding to the one side direction and obtained through the LIDAR corresponding to the other side direction, a difference between the time when the LIDAR corresponding to the one side direction acquires a specific frame and the time when the LIDAR corresponding to the other side direction acquires the specific frame, the speed of the host vehicle, or any combination thereof.

For example, the processor of the object recognition apparatus may move the point obtained through the LIDAR corresponding to the one side direction, by a distance identified based on a product of the difference between the time when the LIDAR corresponding to the one side direction acquires the specific frame and the time when the LIDAR corresponding to the other side direction acquires the specific frame and the speed of the host vehicle.

In a fifth operation 909, the processor of the object recognition apparatus may identify contour points of an object. The processor of the object recognition apparatus may identify the contour points of the object based on the moved points (e.g., points obtained through the LIDAR corresponding to the other side direction) or non-moved points (e.g., points obtained through the LIDAR corresponding to the one side direction).

For example, the processor of the object recognition apparatus may determine the moved points and the non-moved points as points representing one object, and identify the contour point of the object based on the moved point in some parts and the contour point of the object based on the non-moved point in other some parts.

In a sixth operation 911, the processor of the object recognition apparatus may identify contour points of the object. As in the fifth operation 909, the processor of the object recognition apparatus may determine the moved points (e.g., points obtained through the LIDAR corresponding to the other side direction) or non-moved points (e.g., points obtained through the LIDAR corresponding to the one side direction) as points representing one object, and identify the contour point of the object based on the moved point in some parts and the contour point of the object based on the non-moved point in some other parts.

Figure 10:
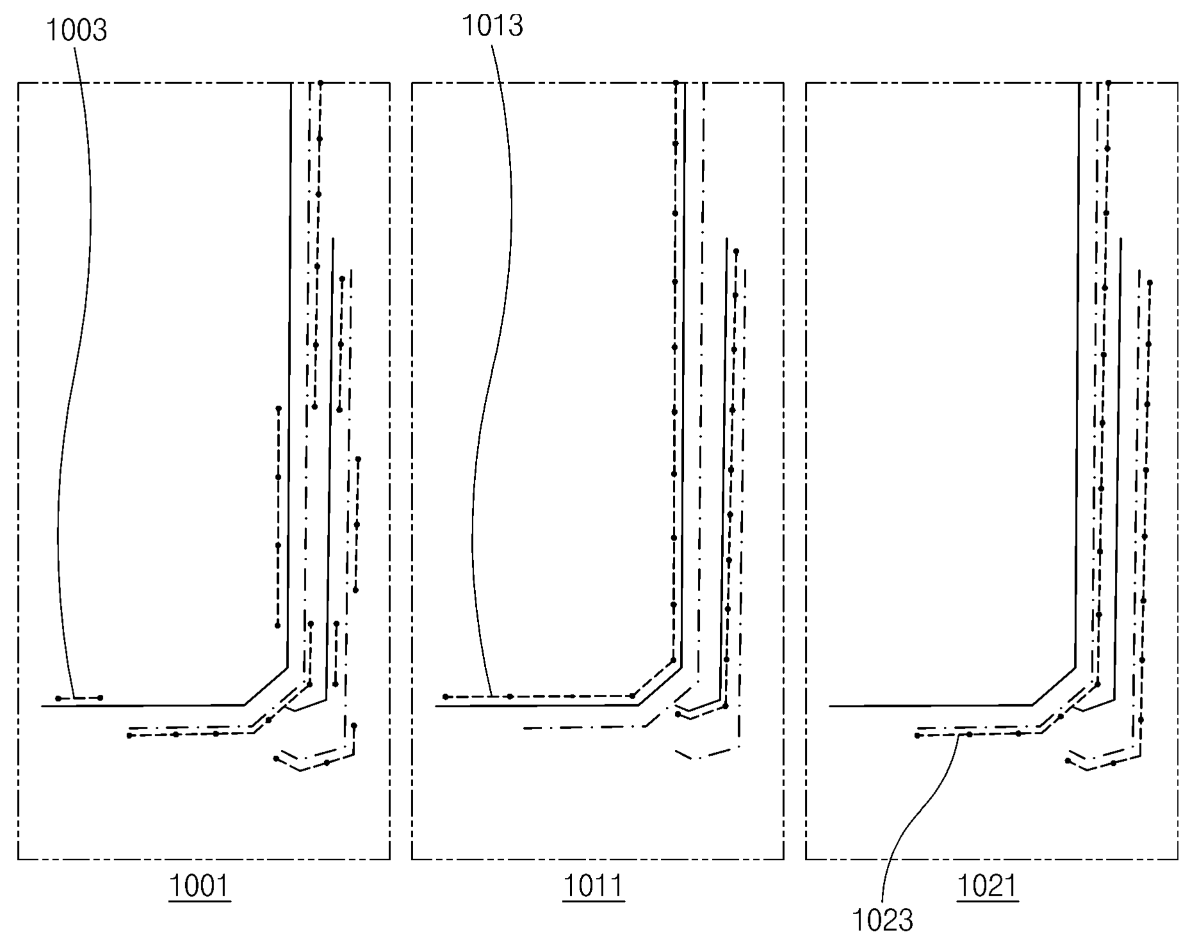
FIG. 10 shows examples of contour points identified based on a plurality of LIDARs and points obtained through one LIDAR in an object recognition apparatus or an object recognition method.

FIG. 10 shows examples of contour points identified based on a plurality of LIDARs and points obtained through one LIDAR in an object recognition apparatus or an object recognition method.

Referring to FIG. 10, a first screen 1001, a second screen 1011, and a third screen 1021 may represent a surrounding environment identified through a first LIDAR and a second LIDAR. The first screen 1001 may include a first contour line 1003 identified based on points obtained through the first LIDAR and the second LIDAR. The second screen 1011 may include a second contour line 1013 identified based on points obtained through the first LIDAR. The third screen 1021 may include a third contour line 1023 identified based on points obtained through the second LIDAR. The first screen 1001, the second screen 1011, and the third screen 1021 may represent an emergency evacuation route and a walking path within a tunnel.

In the first screen 1001, an existing object recognition apparatus may identify contour points based on points obtained through the first LIDAR or points obtained through the second LIDAR. The first contour line 1003 may be a line segment connecting the contour points. As shown in the second screen 1011 and the third screen 1021, the point obtained through the first LIDAR is spaced apart from the point corresponding to the point obtained through the first LIDAR and obtained through the second LIDAR, so that the first contour line 1003 may be identified discontinuously. The accuracy of the location of an object according to a discontinuously identified outline may be lower than the accuracy of the location of an object according to a continuously identified outline.

To increase the accuracy of the location of the object on the first screen 1001, the processor of the object recognition apparatus may move the points obtained through the second LIDAR in the direction of the points obtained through the first LIDAR.

Figure 11:
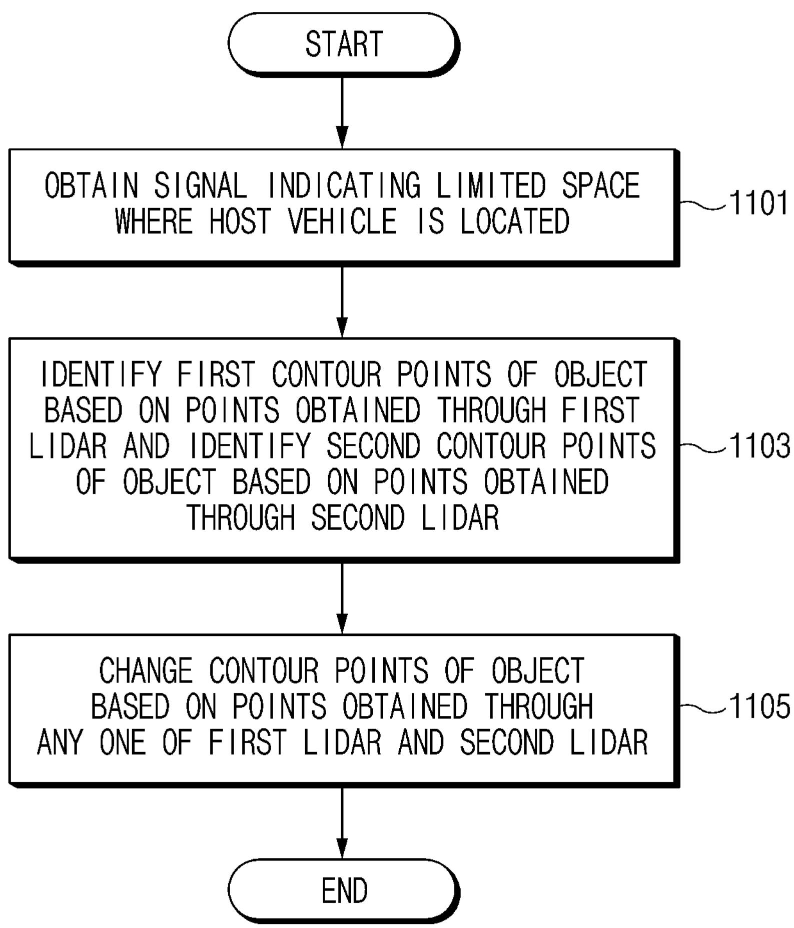
FIG. 11 shows a flowchart of operation of an object recognition apparatus for changing contour points of an object in an object recognition apparatus or an object recognition method.

FIG. 11 shows a flowchart of operation of an object recognition apparatus for changing contour points of an object in an object recognition apparatus or an object recognition method.

Referring to FIG. 11, in a first operation 1101, the processor of the object recognition apparatus may obtain a signal indicating a specific space (e.g., a covered passage, such as a tunnel, or a dark space without sufficient ambient light or natural light) where a host vehicle is located. The first operation 1101 may be performed in the same manner as the operation 601 of FIG. 6, and therefore, repeated description will be omitted below.

In a second operation 1103, the processor of the object recognition apparatus may identify first contour points of an object based on points obtained through a first LIDAR and identify second contour points of the object based on points obtained through a second LIDAR. The contour points may include points representing the outer shape of an object. To reduce the amount of computation, the processor of the object recognition apparatus may identify some points representative of the shape of the object among points representing the object, as contour points of the object.

In a third operation 1105, the processor of the object recognition apparatus may change the contour points of the object identified based on points obtained through any one of the first LIDAR and the second LIDAR.

As mentioned in FIG. 1, the processor of the object recognition apparatus may obtain the location of the object identified by the second LIDAR, which may be different from the location of the object identified by the first LIDAR although the first LIDAR and the second LIDAR identify the same object when a host vehicle is driving in a state in which the first LIDAR and the second LIDAR are spaced apart from each other.

The processor of the object recognition apparatus may change the identified contour points based on points obtained through any one of the first LIDAR or the second LIDAR to accurately specify the location of the object.

The processor of the object recognition apparatus may move first contour points in the driving direction of the host vehicle, or in the direction of second contour points based on identifying that the distance between the second LIDAR and the object is closer than the distance between the first LIDAR and the object.

The processor of the object recognition apparatus may move the first contour points by a distance identified based on at least one of the coordinates of the first contour points, the coordinates of the second contour points, a difference in the time when the first LIDAR acquires a specific frame and the time when the second LIDAR acquires the specific frame, the speed of the host vehicle, or any combination thereof.

For example, the processor of the object recognition apparatus may move the first contour points by a distance identified based on a product of the difference in the time when the first LIDAR acquires a specific frame and the time when the second LIDAR acquires the specific frame, the speed of the host vehicle and the speed of the host vehicle, based on the fact that the distance between the second LIDAR and the object is closer than the distance between the first LIDAR and the object.

The processor of the object recognition apparatus may move third contour points identified based on points corresponding to the other side direction different from one side direction and obtained through any one of the first LIDAR and the second LIDAR, in the driving direction of the host vehicle or in the direction of fourth contour points identified based on points corresponding to one side direction and obtained through one of the first LIDAR and the second LIDAR which is different from the one LIDAR, based on identification of an object located in the one side direction of the host vehicle.

The processor of the object recognition apparatus may move the third contour points by a distance identified based on at least one of the coordinates of the third contour points, the coordinates of the fourth contour points, a difference in the time when one LIDAR acquires a specific frame and the time when another LIDAR acquires the specific frame, the speed of the host vehicle, or any combination thereof.

For example, the processor of the object recognition apparatus move contour points identified based on points obtained through a LIDAR corresponding to the other side direction, by a distance identified based on a product of the difference in the time when the LIDAR corresponding to the other side direction acquires a specific frame and the time when the LIDAR corresponding to the one side direction acquires the specific frame, the speed of the host vehicle and the speed of the host vehicle.

According to an aspect of the present disclosure, an object recognition apparatus includes a first LIDAR, a second LIDAR, and a processor.

According to an example, the processor may identify contour points of an object by using or changing points obtained through any one of the first LIDAR and the second LIDAR among points obtained through the first LIDAR and included in a specific frame and points obtained through the second LIDAR and included in the specific frame, based on obtaining a signal indicating a limited space where a host vehicle is located, from a map system. The points obtained through the first LIDAR and included in the specific frame may be obtained from a same object as the points obtained through the second LIDAR and included in the specific frame.

According to an example, the limited space may include a tunnel. The processor may identify the contour points of the object by using or changing the points obtained through any one of the first LIDAR and the second LIDAR based on being not identified at least one point representing a side mirror and at least one point representing exhaust gas among the points included in the specific frame and representing the object.

According to an example, the processor may identify a shape box included in the specific frame and including the points representing the object, and identify the contour points of the object by using or changing the points obtained through any one of the first LIDAR and the second LIDAR based on identifying that a length of a line segment of the shape box in a longitudinal direction is greater than or equal to a specified length, and a length of a line segment of the shape box in a lateral direction.

According to an example, the processor may identify a shape box including the points included in the specific frame representing the object, and identify the contour points of the object by using or changing the points obtained through any one of the first LIDAR and the second LIDAR based on identifying that a length of a line segment of the shape box in a longitudinal direction is longer than a length of a line segment of the shape box in a lateral direction is greater than or equal to the specified length.

According to an example, the processor may identify the contour points of the object by using the points obtained through the second LIDAR that is close to the object based on identifying that a distance between the second LIDAR and the object is closer than a distance between the first LIDAR and the object.

According to an example, the processor may identify the contour points of the object by using points corresponding to one side direction and obtained through any one of the first LIDAR and the second LIDAR based on identifying an object in the one side direction of the host vehicle.

According to an example, the processor may move a point obtained through the first LIDAR in a driving direction of the host vehicle, or in a direction related to a point corresponding to the point obtained through the first LIDAR and obtained through the second LIDAR and identify the contour points of the object based on the point obtained through the first LIDAR or the point obtained through the second LIDAR, based on identifying that a distance between the second LIDAR and the object is closer than a distance between the first LIDAR and the object. The movement may be performed by a distance identified based on at least one of coordinates of the point obtained through the first LIDAR, coordinates of the point corresponding to the point obtained through the first LIDAR and obtained through the second LIDAR, a difference between a time when the first LIDAR acquires the specific frame and a time when the second LIDAR acquires the specific frame, a speed of the host vehicle, or any combination thereof. The point obtained through the first LIDAR and the point corresponding to the point obtained through the first LIDAR and obtained through the second LIDAR may be obtained from a same part of the object.

According to an example, a spaced distance between a point obtained through one LIDAR and a point corresponding to the point obtained through the one LIDAR and obtained through a LIDAR different from the one LIDAR after the change may be smaller than a spaced distance between the point obtained through the one LIDAR and the point corresponding to the point obtained through the one LIDAR and obtained through the LIDAR different from the one LIDAR before the change. The point obtained through the one LIDAR and the point corresponding to the point obtained through the one LIDAR and obtained through the LIDAR different from the one LIDAR may be obtained from a same part of the object. The spaced distance may be identified through a distance between the point obtained through the one LIDAR and the point corresponding to the point obtained through the one LIDAR and obtained through the LIDAR different from the one LIDAR.

According to an example, the processor may move a point corresponding to another side direction different from one side direction and obtained through one of the first LIDAR and the second LIDAR in a driving direction of the host vehicle or a direction related to a point corresponding to the one side direction and obtained through one of the first LIDAR and the second LIDAR, which is different from the one LIDAR based on identifying an object in one side direction of the host vehicle and identify the contour points of the object based on the point obtained through the one LIDAR or the point obtained through the different LIDAR corresponding to the one side direction. The movement may be performed by a distance identified based on at least one of coordinates of the point obtained through the one LIDAR, coordinates of the point corresponding to the point obtained through the one LIDAR and obtained through the different LIDAR, a difference between a time when the one LIDAR acquires the specific frame and a time when the different LIDAR acquires the specific frame, a speed of the host vehicle, or any combination thereof. The point obtained through the one LIDAR and the point corresponding to the point obtained through the one LIDAR and obtained through the LIDAR different from the one LIDAR may be obtained from a same part of the object.

According to an example, the object may include an emergency escape route in a tunnel. The one side of the host vehicle may include one of a left side of the host vehicle and a right side of the host vehicle. The first LIDAR and the second LIDAR may be arranged to be spaced apart from the host vehicle.

According to another aspect of the present disclosure, an object recognition apparatus may include a first LIDAR, a second LIDAR, and a processor.

According to an example, the processor may change contour points of one group among first contour points and second contour points to reduce a spaced distance between the first contour points of an object identified based on points obtained through the first LIDAR and included in a specific frame and the second contour points of the object identified based on points obtained through the second LIDAR and included in a specific frame, based on obtaining a signal indicating a limited space where a vehicle is located, from the map system. One contour point corresponding to one of the first contour points and one of the second contour points may represent a same part of the object, and the spaced distance may be identified through a distance between the one contour point and a contour point, among the second contour points, corresponding to the one contour point.

According to an example, the processor may move the first contour points in a driving direction of the host vehicle or a direction related to the second contour points based on identifying that a distance between the second LIDAR and the object is closer than a distance between the first LIDAR and the object. The movement may be performed by a distance identified based on at least one of coordinates of the point obtained through the first LIDAR, coordinates of the point corresponding to the point obtained through the first LIDAR and obtained through the second LIDAR, a difference between a time when the first LIDAR acquires the specific frame and a time when the second LIDAR acquires the specific frame, a speed of the host vehicle, or any combination thereof.

According to an example, the processor may move third contour points identified based on points corresponding to another side direction different from the one side direction and obtained through one of the first LIDAR and the second LIDAR in a driving direction of the host vehicle or a direction related to fourth contour points identified based on points corresponding to the one side direction and obtained through one of the first LIDAR and the second LIDAR, which is different from the one LIDAR, or move the third contour points by a distance identified based at least one of coordinates of the third contour points, coordinates of the fourth contour points, a difference in a time when the one LIDAR acquires the specific frame and a time when the different LIDAR acquires the specific frame, a speed of the host vehicle, or any combination thereof, based on identifying the object in one side direction of the host vehicle.

According to another aspect of the present disclosure, an object recognition method may include identifying, by a processor, contour points of an object by using or changing points obtained through any one of a first LIDAR and a second LIDAR among points obtained through the first LIDAR and included in a specific frame and points obtained through the second LIDAR and included in the specific frame based on obtaining a signal indicating a limited space where a vehicle is located, from a map system. The points obtained through the first LIDAR and included in the specific frame may be obtained from a same object as the points included in the specific frame and obtained through the second LIDAR.

According to an example, the limited space may include a tunnel. The identifying of the contour points of the object by using or changing the points obtained through any one of the first LIDAR and the second LIDAR among the points obtained through the first LIDAR and included in the specific frame and the points obtained through the second LIDAR and included in the specific frame may include identifying, by the processor, the contour points of the object by using or changing the points obtained through any one of the first LIDAR and the second LIDAR based on being not identified at least one point representing a side mirror and at least one point representing exhaust gas among the points included in the specific frame and representing the object.

According to an example, the identifying of the contour points of the object by using or changing the points obtained through any one of the first LIDAR and the second LIDAR among the points obtained through the first LIDAR and included in the specific frame and the points obtained through the second LIDAR and included in the specific frame may include identifying, by the processor a shape box included in the specific frame and including the points representing the object, and identifying, by the processor, the contour points of the object by using or changing the points obtained through any one of the first LIDAR and the second LIDAR based on identifying that a length of a line segment of the shape box in a longitudinal direction is greater than or equal to a specified length, and a length of a line segment of the shape box in a lateral direction is greater than or equal to the specified length.

According to an example, the identifying of the contour points of the object by using or changing the points obtained through any one of the first LIDAR and the second LIDAR among the points obtained through the first LIDAR and included in the specific frame and the points obtained through the second LIDAR and included in the specific frame may include identifying, by the processor a shape box included in the specific frame and including the points representing the object, and identifying, by the processor, the contour points of the object by using or changing the points obtained through any one of the first LIDAR and the second LIDAR based on identifying that a length of a line segment of the shape box in a longitudinal direction is longer than a length of a line segment of the shape box in a lateral direction.

According to an example, the identifying of the contour points of the object by using or changing the points obtained through any one of the first LIDAR and the second LIDAR among the points obtained through the first LIDAR and included in the specific frame and the points obtained through the second LIDAR and included in the specific frame may include identifying, by the processor, the contour points of the object by using the points obtained through the second LIDAR that is close to the object based on identifying that a distance between the second LIDAR and the object is closer than a distance between the first LIDAR and the object.

According to an example, the identifying of the contour points of the object by using or changing the points obtained through any one of the first LIDAR and the second LIDAR among the points obtained through the first LIDAR and included in the specific frame and the points obtained through the second LIDAR and included in the specific frame may include identifying, by the processor, the contour points of the object by using points corresponding to one side direction and obtained through any one of the first LIDAR and the second LIDAR based on identifying an object in the one side direction of the host vehicle.

According to an example, the identifying of the contour points of the object by using or changing the points obtained through any one of the first LIDAR and the second LIDAR among the points obtained through the first LIDAR and included in the specific frame and the points obtained through the second LIDAR and included in the specific frame may include moving, by the processor, a point obtained through the first LIDAR in a driving direction of the host vehicle, or in a direction related to a point corresponding to the point obtained through the first LIDAR and obtained through the second LIDAR and identifying, by the processor, the contour points of the object based on the point obtained through the first LIDAR or the point obtained through the second LIDAR, based on identifying that a distance between the second LIDAR and the object is closer than a distance between the first LIDAR and the object. The movement may be performed by a distance identified based on at least one of coordinates of the point obtained through the first LIDAR, coordinates of the point corresponding to the point obtained through the first LIDAR and obtained through the second LIDAR, a difference between a time when the first LIDAR acquires the specific frame and a time when the second LIDAR acquires the specific frame, a speed of the host vehicle, or any combination thereof. The point obtained through the first LIDAR and the point corresponding to the point obtained through the first LIDAR and obtained through the second LIDAR may be obtained from a same part of the object.

Figure 12:
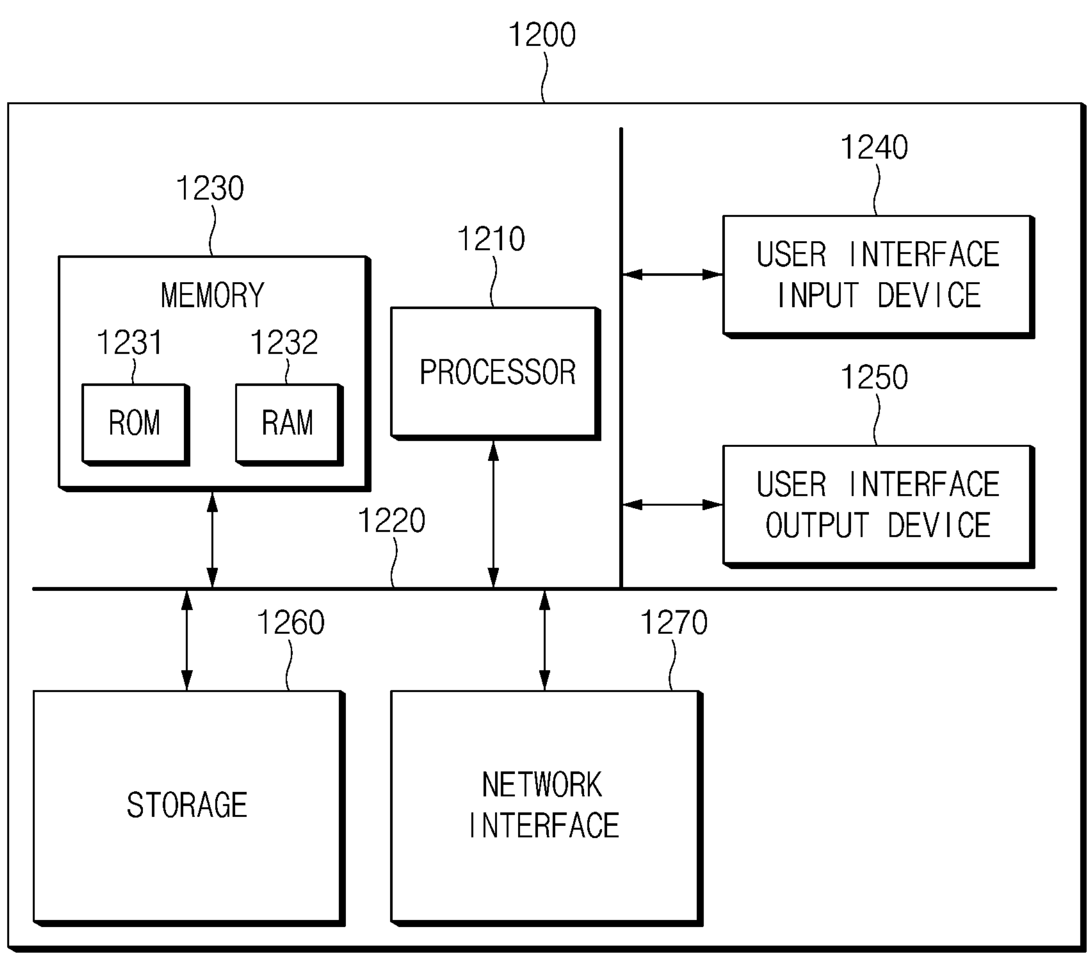
FIG. 12 illustrates a computing system for an object recognition apparatus and an object recognition method.

FIG. 12 illustrates a computing system for an object recognition apparatus and an object recognition method.

Referring to FIG. 12, a computing system 1200 may include at least one processor 1210, a memory 1230, a user interface input device 1240, a user interface output device 1250, storage 1260, and a network interface 1270, which are connected with each other via a bus 1220.

The processor 1210 may be a central processing unit (CPU) or a semiconductor device that processes instructions stored in the memory 1230 and/or the storage 1260. The memory 1230 and the storage 1260 may include various types of volatile or non-volatile storage media. For example, the memory 1230 may include a ROM (Read Only Memory) 1231 and a RAM (Random Access Memory) 1232.

Thus, the operations of the method or the algorithm described in connection with the features disclosed herein may be embodied directly in hardware or a software module executed by the processor 1210, or in a combination thereof. The software module may reside on a storage medium (that is, the memory 1230 and/or the storage 1260) such as a RAM, a flash memory, a ROM, an EPROM, an EEPROM, a register, a hard disk, a removable disk, and a CD-ROM.

The exemplary storage medium may be coupled to the processor 1210, and the processor 1210 may read information out of the storage medium and may record information in the storage medium. Alternatively or additionally, the storage medium may be integrated with the processor 1210. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains.

Accordingly, the exemplary features disclosed in the present disclosure are not intended to limit the technical idea of the present disclosure but to describe the present disclosure, and the scope of the technical idea of the present disclosure is not limited by the illustrated examples. The scope of protection of the present disclosure should be interpreted by the following claims, and all technical ideas within the scope equivalent thereto should be construed as being included in the scope of the present disclosure.

The present technology can increase the accuracy of the position of an object identified through a LIDAR by proposing a reference for processing points obtained through a plurality of LIDARs which are spaced apart each other.

Additionally, the present technology can increase the accuracy of the location of a host vehicle identified in a limited space by proposing a reference for processing points through a plurality of LIDARs.

Additionally, the present technology can reduce the amount of computation by processing points obtained through a plurality of LIDARs only when an object to be identified is a specified object.

In addition, various effects may be provided that are directly or indirectly understood through the disclosure.

Hereinabove, although the present disclosure has been described with reference to some examples and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus comprising:

a first sensor;

a second sensor;

a processor; and memory storing instructions that, when executed by the processor, cause the apparatus to:

identify, based on sensing information of the first sensor, a plurality of first candidate contour points of a stationary object, wherein the plurality of first candidate contour points corresponds to a specific frame;

identify, based on sensing information of the second sensor, a plurality of second candidate contour points of the stationary object, wherein the plurality of second candidate contour points corresponds to the specific frame;

while a vehicle is driving in an area associated with a predefined type, determine, based on a direction of the stationary object from the vehicle, contour points of the stationary object, wherein the determined contour points of the stationary object are further based on:

the plurality of first candidate contour points and an adjustment of the second candidate contour points; or the plurality of second candidate contour points and an adjustment of the first candidate contour points; and generate a signal indicating the determined contour points of the stationary object to display a location of the stationary object in a map.

2. The apparatus of claim 1, wherein the area associated with the predefined type comprises a tunnel, and wherein the instructions, when executed by the processor, cause the apparatus to determine that the stationary object is not a dynamic object based on the contour points not representing a side mirror and not representing exhaust gas.

3. The apparatus of claim 1, wherein the instructions, when executed by the processor, cause the apparatus to:

identify a shape box representing the stationary object, wherein the shape box comprises at least one of: the plurality of first candidate contour points or the plurality of second candidate contour points, and determine the contour points of the stationary object based on a length of a line segment of the shape box in a longitudinal direction being greater than or equal to a first threshold length, and a length of a line segment of the shape box in a lateral direction being greater than or equal to a second threshold length, wherein the longitudinal direction includes a direction in parallel to a road boundary direction, and wherein the lateral direction includes a direction perpendicular to the road boundary direction.

4. The apparatus of claim 1, wherein the instructions, when executed by the processor, cause the apparatus to identify a shape box in the specific frame, wherein the shape box comprises at least one of: the plurality of first candidate contour points or the plurality of second candidate contour points, and determine the contour points based on a length of a line segment of the shape box in a longitudinal direction being longer than a length of a line segment of the shape box in a lateral direction, wherein the longitudinal direction includes a direction in parallel to a road boundary direction, and wherein the lateral direction includes a direction perpendicular to the road boundary direction.

5. The apparatus of claim 1, wherein the instructions, when executed by the processor, cause the apparatus to determine the contour points based on:

the plurality of second candidate contour points; and a distance between the second sensor and the stationary object being closer than a distance between the first sensor and the stationary object, and wherein the adjustment of the first candidate contour points comprises an exclusion of at least one of the first candidate contour points.

6. The apparatus of claim 1, wherein the instructions, when executed by the processor, cause the apparatus to determine the contour points based on:

the plurality of first candidate contour points; and the stationary object being located at a side direction of the vehicle, wherein the first sensor is located at the side direction of the vehicle, and wherein the adjustment of the second candidate contour points comprises an exclusion of at least one of the second candidate contour points.

7. The apparatus of claim 1, wherein the instructions, when executed by the processor, cause the apparatus to, based on a distance between the second sensor and the stationary object being closer than a distance between the first sensor and the stationary object:

move at least one candidate contour point of the plurality of first candidate contour points toward a driving direction of the vehicle, and determine the contour points, wherein an amount of the movement of the at least one candidate contour point of the plurality of first candidate contour points is determined based on a distance identified based on at least one of:

coordinates of a first point of the plurality of first candidate contour points, coordinates of a second point of the plurality of second candidate contour points corresponding to the first point, a difference between a time when the first sensor acquires the specific frame and a time when the second sensor acquires the specific frame, or a speed of the vehicle.

8. The apparatus of claim 1, wherein an adjusted spaced distance between a first point obtained via the first sensor and an adjusted point that is obtained via the second sensor and corresponds to the first point is smaller than an unadjusted spaced distance between the first point and an unadjusted point that is obtained via the second sensor and corresponds to the first point, and wherein the first point and the unadjusted point are obtained from a same part of the stationary object.

9. The apparatus of claim 1, wherein the instructions, when executed by the processor, cause the apparatus to:

based on identifying the stationary object in one side direction of the vehicle, move a point corresponding to another side direction of the vehicle different from the one side direction and obtained through one of the first sensor or the second sensor toward a driving direction of the vehicle; and determine the contour points of the stationary object based on one of the first sensor or the second sensor that corresponds to the one side direction.

10. The apparatus of claim 1, wherein the stationary object comprises an emergency escape route in a tunnel, and wherein the first sensor and the second sensor are installed on the vehicle and arranged to be spaced apart from each other.

11. An apparatus comprising:

a first sensor;

a second sensor;

a processor; and memory storing instructions that, when executed by the processor, cause the apparatus to:

identify, based on sensing information of the first sensor, a plurality of first candidate contour points of a stationary object, wherein the plurality of first candidate contour points corresponds to a specific frame;

identify, based on sensing information of the second sensor, a plurality of second candidate contour points of the stationary object, wherein the plurality of second candidate contour points corresponds to the specific frame; and while a vehicle is driving in an area associated with a predefined type, adjust the plurality of first candidate contour points or the plurality of second candidate contour points to reduce a spaced distance between the plurality of first candidate contour points and the plurality of second candidate contour points, wherein one of the plurality of first candidate contour points and one of the plurality of second candidate contour points represent a same part of the stationary object, and wherein the spaced distance is determined based on a distance between the one of the plurality of first candidate contour points and the one of the plurality of second candidate contour points.

12. The apparatus of claim 11, wherein the instructions, when executed by the processor, cause the apparatus to move the plurality of first candidate contour points in a driving direction of the vehicle based on a distance between the second sensor and the stationary object being closer than a distance between the first sensor and the stationary object, and wherein an amount of the movement of the plurality of first candidate contour points is determined based on a distance identified based on at least one of:

coordinates of a first point of the plurality of first candidate contour points, coordinates of a second point of the plurality of second candidate contour points corresponding to the first point, a difference between a time when the first sensor acquires the specific frame and a time when the second sensor acquires the specific frame, or a speed of the vehicle.

13. The apparatus of claim 11, wherein the instructions, when executed by the processor, cause the apparatus to adjust the plurality of first candidate contour points or the plurality of second candidate contour points by:

based on identifying the stationary object in a first side direction of the vehicle, moving one or more candidate contour points identified based on points corresponding to a second side direction of the vehicle different from the first side direction of the vehicle in a driving direction of the vehicle, wherein an amount of the movement of the one or more candidate contour points by a distance identified based at least one of:

coordinates of the one or more candidate contour points, coordinates of one or more candidate contour points identified based on points corresponding to the first side direction, a difference in a time when the first sensor acquires the specific frame and a time when the second sensor acquires the specific frame, or a speed of the vehicle.

14. A method comprising:

identifying, by a processor and based on sensing information of a first sensor, a plurality of first candidate contour points of a stationary object, wherein the plurality of first candidate contour points corresponds to a specific frame;

identifying, by the processor and based on sensing information of a second sensor, a plurality of second candidate contour points of the stationary object, wherein the plurality of second candidate contour points corresponds to the specific frame;

while a vehicle is driving in an area associated with a predefined type, determining, based on a direction of the stationary object from the vehicle, contour points of the stationary object, wherein the determined contour points of the stationary object are further based on:

the plurality of first candidate contour points and an adjustment of the second candidate contour points; or the plurality of second candidate contour points and an adjustment of the first candidate contour points; and generating a signal indicating the determined contour points of the stationary object to display a location of the stationary object in a map.

15. The method of claim 14, wherein the area associated with the predefined type comprises a tunnel, and wherein the method further comprises determining that the stationary object is not a dynamic object based on the contour points not representing a side mirror and not representing exhaust gas.

16. The method of claim 14, further comprising:

determining, by the processor, a shape box representing the stationary object, wherein the shape box comprises at least one of: the plurality of first candidate contour points or the plurality of second candidate contour points; and determining, by the processor, the contour points of the stationary object based on a length of a line segment of the shape box in a longitudinal direction being greater than or equal to a first threshold length, and a length of a line segment of the shape box in a lateral direction being greater than or equal to a second threshold length, wherein the longitudinal direction includes a direction in parallel to a road boundary direction, and wherein the lateral direction includes a direction perpendicular to the road boundary direction.

17. The method of claim 14, further comprising:

identifying, by the processor a shape box in the specific frame, wherein the shape box comprises at least one of: the plurality of first candidate contour points or the plurality of second candidate contour points; and determining, by the processor, the contour points based on a length of a line segment of the shape box in a longitudinal direction being longer than a length of a line segment of the shape box in a lateral direction, wherein the longitudinal direction includes a direction in parallel to a road boundary direction, and wherein the lateral direction includes a direction perpendicular to the road boundary direction.

18. The method of claim 14, wherein the determining of the contour points comprises:

determining, by the processor, the contour points based on:

the plurality of second candidate contour points; and a distance between the second sensor and the stationary object being closer than a distance between the first sensor and the stationary object, and wherein the adjustment of the first candidate contour points comprises an exclusion of at least one of the first candidate contour points.

19. The method of claim 14, wherein the determining of the contour points comprises:

determining, by the processor, the contour points based on:

the plurality of first candidate contour points; and the stationary object being located at a side direction of the vehicle, wherein the first sensor is located at the side direction of the vehicle, and wherein the adjustment of the second candidate contour points comprises an exclusion of at least one of the second candidate contour points.

20. The method of claim 14, wherein the determining of the contour points comprises, based on a distance between the second sensor and the stationary object being closer than a distance between the first sensor and the stationary object:

moving, by the processor, at least one candidate contour point of the plurality of first candidate contour points toward a driving direction of the vehicle; and determining, by the processor, the contour points, wherein an amount of the movement of the at least one candidate contour point of the plurality of first candidate contour points is determined based on a distance identified based on at least one of:

coordinates of a first point of the plurality of first candidate contour points, coordinates of a second point of the plurality of second candidate contour points corresponding to the first point, a difference between a time when the first sensor acquires the specific frame and a time when the second sensor acquires the specific frame, or a speed of the vehicle.

* * * * *